May 14, 1968  R. L. TRIMBLE  3,382,745
BAG OR CASING CLOSING TOOL

Filed March 16, 1967  3 Sheets-Sheet 1

ROY LANE TRIMBLE
INVENTOR.

his attorney

ROY LANE TRIMBLE
*INVENTOR.*

May 14, 1968     R. L. TRIMBLE     3,382,745
BAG OR CASING CLOSING TOOL

Filed March 16, 1967     3 Sheets-Sheet 3

ROY LANE TRIMBLE
*INVENTOR.*

Neal J. Mosely
his attorney

United States Patent Office 3,382,745
Patented May 14, 1968

3,382,745
BAG OR CASING CLOSING TOOL
Roy Lane Trimble, Danville, Ill., assignor to
Tee-Pak, Inc., a corporation of Illinois
Filed Mar. 16, 1967, Ser. No. 623,606
7 Claims. (Cl. 81—311)

ABSTRACT OF THE DISCLOSURE

A tool for gathering and clamping a bag or casing at spaced points in preparation for tying or clipping consists of a pair of handles pivotally connected and carrying at one end two pairs of V-shaped or hooked shaped clamping members. The clamping members are moved by movement of the handles into gripping relation wherein the jaw members overlap each other and grip the bag or casing to be gathered or closed at closely spaced intervals. The jaw members are pivotally mounted on the ends of the respective handles and spring biased toward each other. The handles are provided with an overtravel mechanism permitting relative movement of the handles beyond the point where the jaw members are moved into gripping relation. Relative movement of the handles beyond the point where the jaw members are in gripping relation is effective to pivot the jaw members laterally and thus provide two spaced gripping points on the bag or casing being closed while maintaining the jaw members in gripping relation.

Background of the invention

In the manufacture of medium and large sized sausages such as bologna or Tee-Wurst, large diameter sausage casings are stuffed with a sausage emulsion and are usually formed into small chubs. The sausage casing, usually a clear regenerated cellulose casing or a fibrous paper-reinforced cellulose casing, is usually clipped or tied at one end and then stuffed full of sausage emulsion. At periodic intervals along the length of the stuffed casing the casing is pinched or gathered together and meat stripped so that the casing is gathered tightly and a tie or clip applied to the casing at spaced points so that the chubs which are formed can be severed from each other while maintaining a closure at each end of the chub. In the past, the gathering, stripping, and tying or clipping of the ends of the chubs has been a hand operation which is slow and somewhat inefficient. There has been a need for a tool which will gather, strip, and close a stuffed casing at spaced intervals so that one or more ties or clips can be applied to the gathered casing. This invention therefore has for its object, the provision of an improved clamping tool for closing bags or casings which has two pairs of jaws which are moved into gripping relation gathering and clamping the casing or bag at two closely spaced points. The tool is constructed so that after the jaws are moved into gripping relation the pairs of jaws are moved laterally apart so that the bag or casing is gripped at spaced points thus exposing a portion of gathered bag or casing for tying or clipping.

Summary of the invention

This invention comprises a new and improved clamping tool for closing bags or casings in preparation for tying or clipping. The clamping tool is of a construction similar to pliers, having a pair of handles which are pivotally connected to each other. The handles are each provided with a pair of jaw members which are movable into and out of gripping relation to the jaw members on the opposite handle. Each of the jaw members is movably mounted on its respective handle and spring biased toward the other jaw member supported on the same handle. The tool is provided with a lost motion or overtravel linkage in one of the handles so that when the handles are operated to move the jaw members to gripping relation the handles may be moved relative to each other beyond the gripping position. As the handles are moved beyond the gripping position the jaw members are operatively engaged by one of the handles and moved laterally against the spring biasing force to cause the casing or bag being gripped to be secured at two spaced points and thus providing a portion of bag or casing which is clamped or gathered and available for clipping or tying.

Brief description of the drawing

In the accompanying drawings, there is shown a preferred embodiment of this invention, in which drawings.

Description of the preferred embodiment

Figure 1:
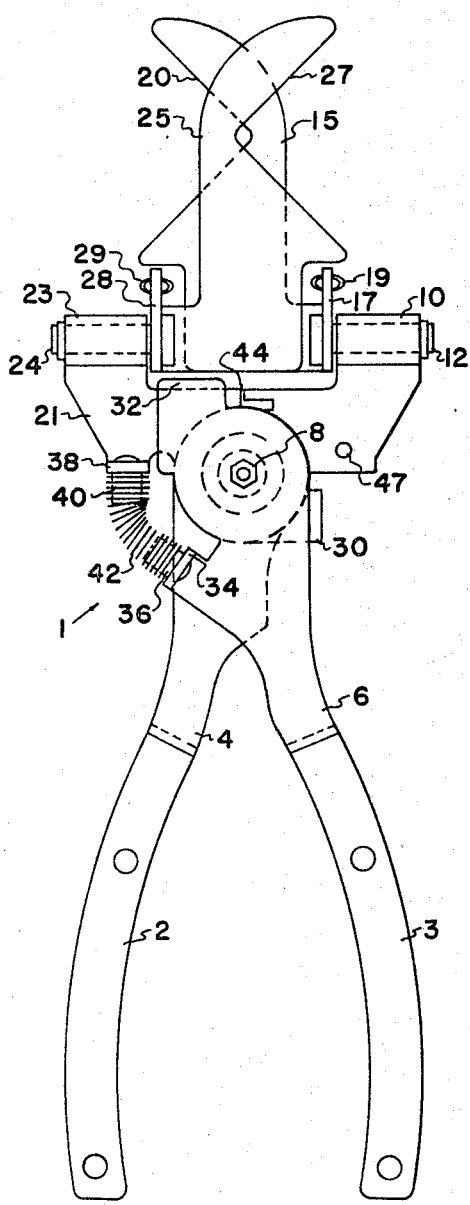
FIG. 1 is a plan view of an improved clamping tool for closing bags or casings.

Referring to the drawings by numerals of reference and more particularly to FIG. 1, there is shown a clamping tool generally designated 1 which has the general construction and configuration of a pair of pliers. Clamping tool 1 includes handles 2 and 3 which are bifurcated at their upper ends, being provided with prongs 4 and 5 on handle 2 and prongs 6 and 7 on handle 3. Prongs 4, 5, 6 and 7 are pivotally connected by pivot pin 8 and bushing 9.

The upper ends of prongs 4 and 5 have supported on and integral therewith bushing members 10 and 11 in which there are positioned pivot pins 12 and 13 which support jaw members 15 and 16 for pivotal movement. Jaw members 15 and 16 are provided with ears 17 and 18 which are interconnected by spring 19 which biases jaw members 15 and 16 toward each other. Jaw members 15 and 16 are each provided with a V-notch 20 which cooperates with a corresponding V-notch in a cooperating jaw member for gathering or clamping the casing or bag being closed.

Handle 3 is constructed similarly to handle 2 but is provided with a lost motion or overtravel linkage between the handle and the support for the pivoted jaw members. Handle 3 is provided with separate support members 21 and 22 which are pivotally mounted on pivot pin 8 and bushing 9 adjacent to prongs 6 and 7 respectively. Support members 21 and 22 each have bushings 23 and pivot pins 24 supported thereon, on which there are pivotally supported jaw members 25 and 26. Jaw members 25 and 26 are each provided with V-notches 27 which cooperate with V-notches 20 to gather and clamp the casing.

Jaw members 25 and 26 are each provided with ears 28 which are interconnected by spring 29 which has bias clamp members 25 and 26 toward each other. Support members 21 and 22 are each provided with outturned ears 30 and 31 which engage prongs 6 and 7 respectively to limit the motion of members 21 and 22 in the clockwise direction as viewed in FIG. 1. Prongs 6 and 7 of handle 3 terminate at their upper ends in ears or inturned flanges 32 and 33 which overlie a portion of support members 21 and 22 and extend beneath clamping jaws 15, 16, 25 and 26 when the tool is in the closed position as shown in FIG. 1.

Handle 3 is also provided with outturned ears 34 and 35 carrying pins 36 and 37. Support members 21 and 22 are provided outturned ears 38 and 39, respectively, which are provided with pins 40 and 41. Helical spring 42 is positioned between flanges or ears 34 and 38 and surrounds pins 36 and 40 at its opposite ends. Helical spring 43 is likewise positioned between flanges or ears 35 and 39 and surrounds pins 37 and 41 at its opposite ends. The springs 42 and 43 bias members 21 and 22 in a clockwise direction as viewed in FIG. 1 and provide a lost motion or overtravel mechanism between handle 3 and the support for jaw members 25 and 26.

Figure 2:
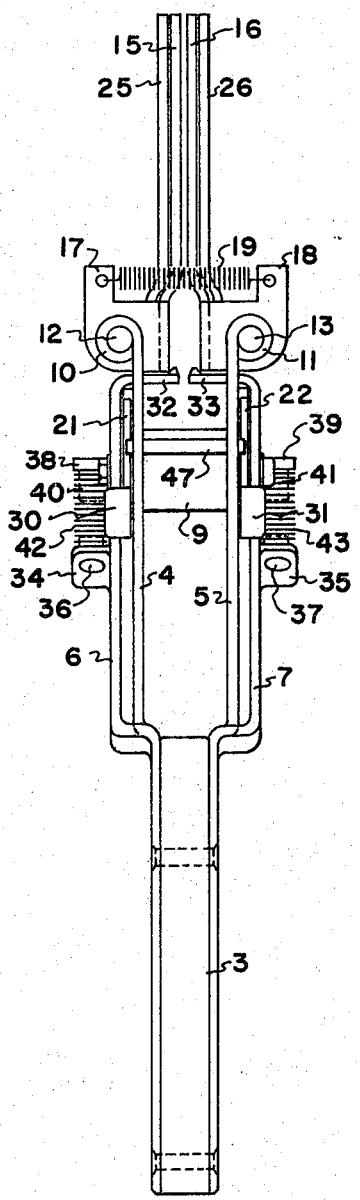
FIG. 2 is a view in right elevation of the clamping tool shown in FIG. 1.
Figure 3:
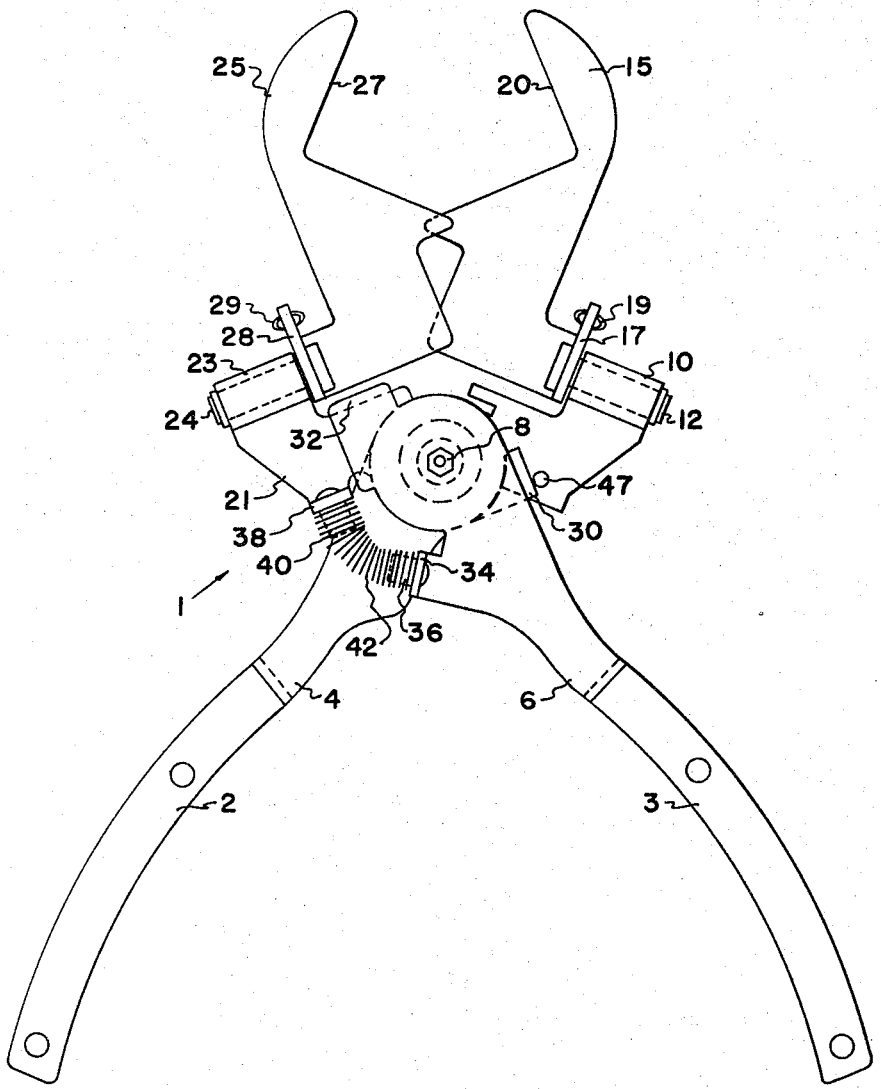
FIG. 3 is a plan view of the tool, shown in FIG. 1, in an opened position.

In operation, the clamping tool is operated in essentially the same manner as a pair of pliers. When handles 2 and 3 are separated, as shown in FIG. 3, jaw members 25 and 26 are separated from jaw members 15 and 16 to the point where pin 47 engages flanges 30 and 31. When the tool is used to clamp a bag or casing, especially a casing stuffed with sausage emulsion, it is placed around the portion to be clamped with V-notches 20 and 27 engaging the portion to be clamped. As the handles 2 and 3 are compressed together, jaw members 15 and 16 move between jaw members 25 and 26 and eventually reach the position shown in FIGS. 1 and 2. In this position, the upper end portion of handle 4 abuts against support members 21 and 22 as indicated at 44.

Figure 4:
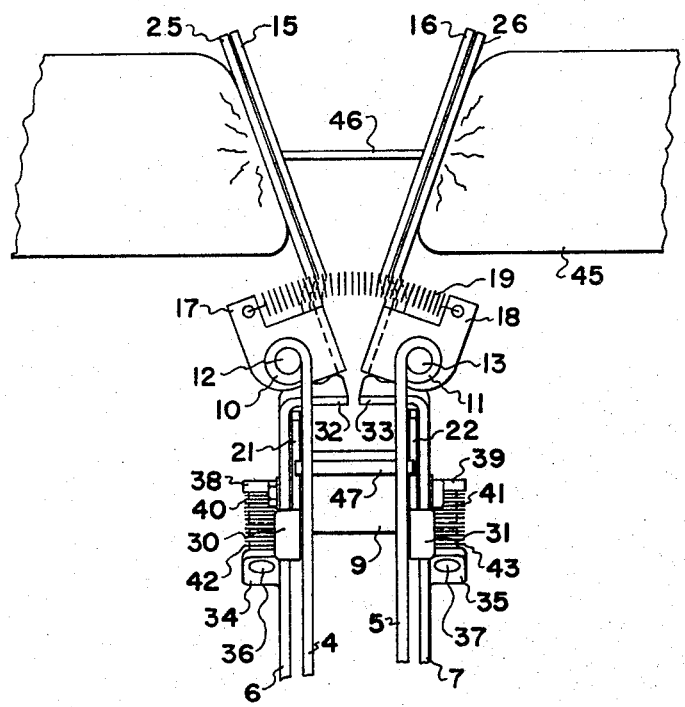
FIG. 4 is a fragmentary view of the clamping portion of the tool shown in FIG. 2, but moved to an operated position and illustrating the relation of the tool to a casing being clamped by the tool.

When handles 2 and 3 are squeezed closer together, springs 42 and 43 are collapsed and handle 3 is allowed to move relative to support members 21 and 22 in a clockwise direction as viewed in FIG. 1. The clockwise rotation of handle 3 in relation to members 21 and 22 causes flanges or ears 32 and 33 to rotate upwardly against the base of jaw members 15 and 16 and 25 and 26. This further movement of ears 32 and 33 against the base of the jaw members causes jaw members 15 and 25 to be pivoted to the left and jaw members 16 and 26 to be pivoted to the right as viewed in FIG. 2. In a fully operated position, jaw members 15 and 25 are moved to an extended leftward position and jaw members 16 and 26 are moved to an extended rightward position as seen in FIG. 4. In this position there is shown a stuffed sausage casing 45 having a casing portion 46 clamped in clamp members 15 and 25 at the left and 16 and 26 at the right, thus provided a gathered and clamped portion of casing to which there can be applied a tie or clip. In fact, in the handling of stuffed casings, two ties or clips would be applied to the gathered casing portion 46 so that it could be cut apart later without being opened. When the handles 2 and 3 are again opened, the counter clockwise rotation of handle 3 moves flanges or ears 32 and 33 out of engagement with the base portion of the jaw members 15, 25, 16 and 26 and permits springs 19 and 29 to pull the jaw members back into juxtaposition as shown in FIG. 2.

Figure 5:
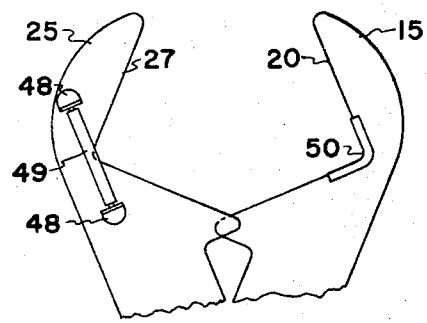
FIG. 5 is a detail view of an alternate embodiment of the jaws of the clamping tool.

In FIG. 5 there is shown an alternate embodiment of the jaw members 15 (and 16) and 25 (and 26). In this embodiment, clamp member 25 (and 26) is provided with roller 49 mounted in bearings 48 to facilitate lateral movement to the position shown in FIG. 4. Jaw member 15 (and 16) is provided with a Teflon (polytetrafluoroethylene) insert 50 which facilitates lateral movement of the clamp member along the surface of the casing or bag being clamped.

While this invention has been described with special emphasis upon a single preferred embodiment, it will be apparent to those skilled in the art that many equivalent structures are possible and within the scope of the appended claims the invention may be practiced otherwise than as specifically described therein.

I claim:
1. A clamping tool for closing bags or casings in preparation for tying or clipping which comprises,
 a first pair of jaw members having a supporting handle,
 a second pair of jaw members having a supporting handle,
 said handles being pivotally connected and operable to to move said pairs of jaw members into and out of gripping relation, said jaw members each being movably supported on the respective handles to permit lateral movement when in gripping relation,
 spring means biasing each one of said pair of jaw members toward the other,
 and means operated by one of said handles when said jaw members are moved into gripping relation to move each of said pair of jaw members laterally to grip the casing or bag being closed at spaced points.

2. A clamping tool as defined in claim 1 in which one of said handles is provided with a spring-biased overtravel linkage permitting movement of the handle beyond the point where said jaw members are in gripping relation,
 and the last named means including means on said one handle operatively engageable with said jaw members upon overtravel of the handle to move said jaw members laterally while in gripping relation.

3. A clamping tool as defined in claim 2 in which said jaw members are pivotally supported on the respective handles,
 and said means on said one handle including abutment means engageable with said jaw members to cause the same to pivot laterally during overtravel of said handle.

4. A clamping tool as defined in claim 3 in which each of said handles is bifurcated and pivotally connected at the bifurcated ends,
 said jaw members being pivotally supported one on each of the bifurcated ends of said handles,
 and said abutment means including inturned flange portions engageable with the base of each said jaw members when in gripping relation and moveable thereagainst during overtravel of said one handle to cause the jaw members on opposite portions of each handle to pivot away from each other while maintaining said gripping relation.

5. A clamping tool as defined in claim 4 in which said jaw members are provided with means to reduce the frictional resistance to lateral movement while in said gripping position.

6. A clamping tool as defined in claim 5 in which said friction reducing means comprises roller bearings supported on at least two of said jaw members in position engaging the work being clamped.

7. A clamping tool as defined in claim 5 in which said friction reducing means comprises polytetrafluoroethylene inserts in at least two of said jaw members.

References Cited

UNITED STATES PATENTS

| | | | |
|---|---|---|---|
| 1,170,334 | 2/1916 | Riggs | 81—303 |
| 1,488,811 | 4/1924 | Garletts. | |
| 2,842,992 | 7/1958 | Hindenburg | 81—9.5 |

MILTON S. MEHR, *Primary Examiner.*